United States Patent [19]
Draxler

[11] 3,831,631
[45] Aug. 27, 1974

[54] MICRO TORCH

[75] Inventor: Walter E. Draxler, Arlington Heights, Ill.

[73] Assignee: Golconda Corporation, Chicago, Ill.

[22] Filed: Feb. 16, 1973

[21] Appl. No.: 333,308

[52] U.S. Cl................. 137/606, 251/340, 239/413
[51] Int. Cl........................................... E03b, E03c
[58] Field of Search ...... 239/413; 137/606; 251/340

[56] References Cited
UNITED STATES PATENTS

| | | | |
|---|---|---|---|
| 1,793,052 | 2/1931 | Buttner | 239/413 |
| 2,971,742 | 2/1961 | Fausek et al. | 251/340 |
| 3,111,980 | 11/1963 | Spies | 251/340 |
| 3,246,849 | 4/1966 | Aske | 239/413 |
| 3,467,133 | 9/1969 | Justis | 251/215 |
| 3,567,132 | 3/1971 | Nikolaevich Shashkou et al. | 239/413 |
| 3,642,266 | 2/1972 | Diehl et al. | 239/413 |

*Primary Examiner*—Carroll B. Dority, Jr.

[57] ABSTRACT

A micro torch for oxygen-acetylene, and other gases, having a handle as small as approximately ¾ inch in diameter and four inches in length, in which the gas mixture controls are knurled members having contiguous edges both movable in the same directions for "on" and "off" adjustably to control roller valves for gas flow proportioning preferably with a gearing drive interengagement between a valve gear and a ring gear segment for micro control of the flame.

14 Claims, 7 Drawing Figures

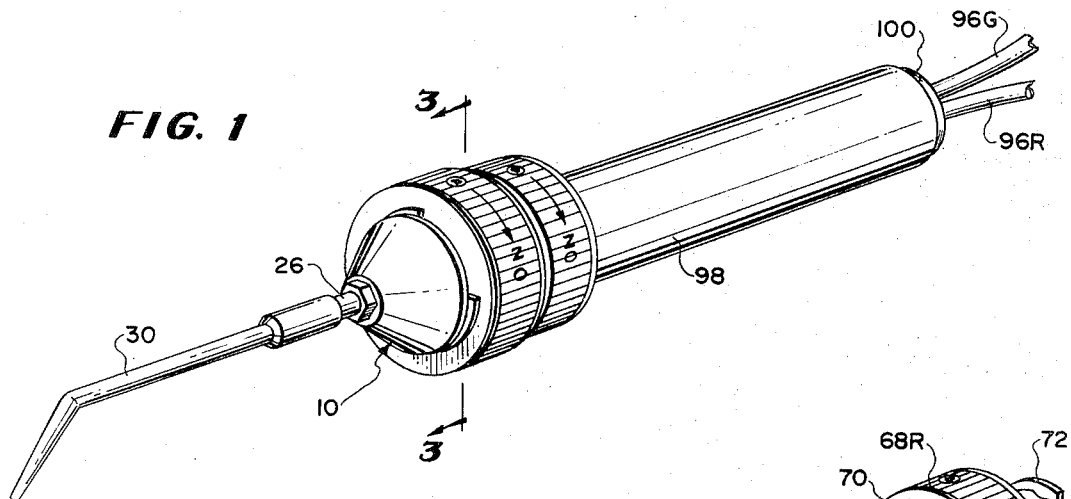
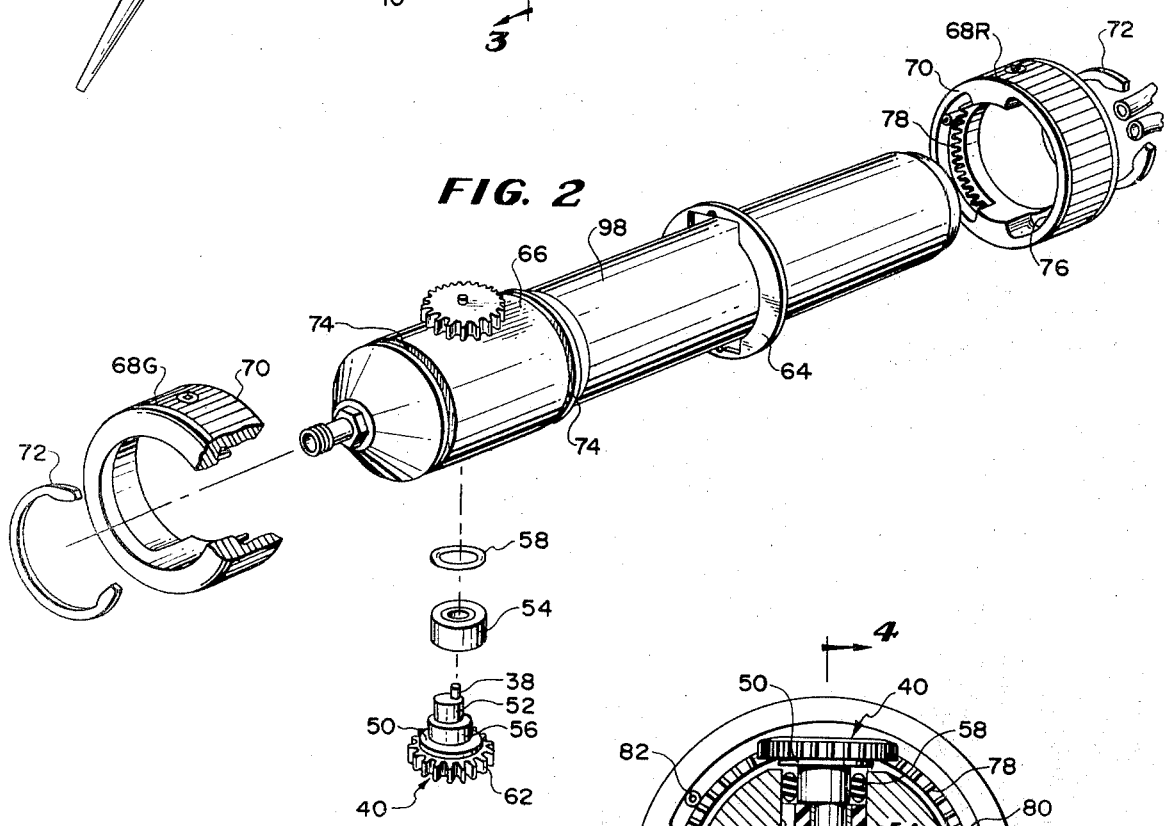
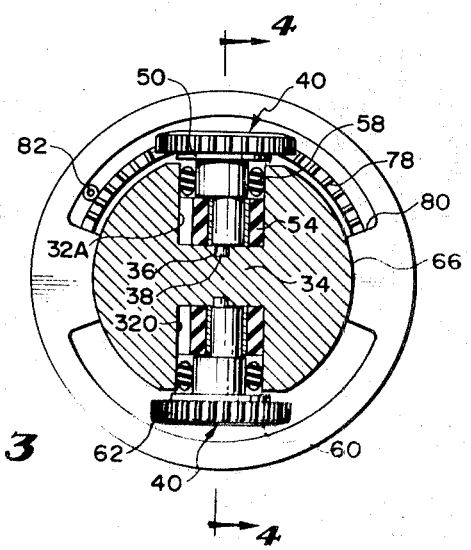

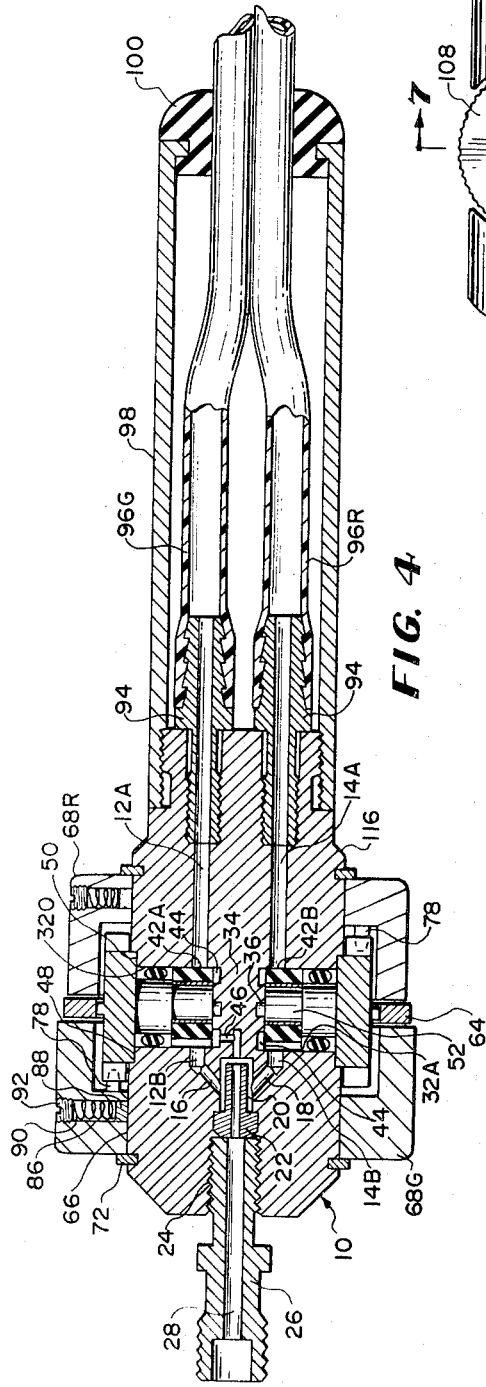
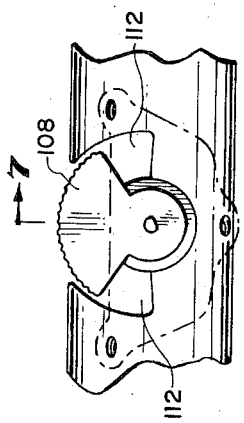
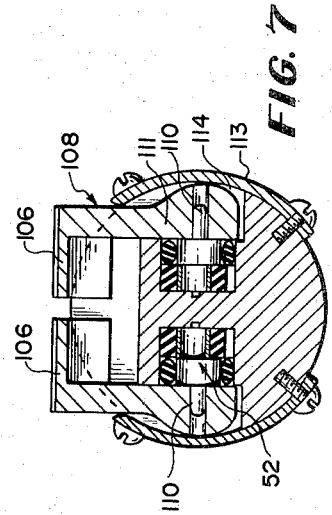
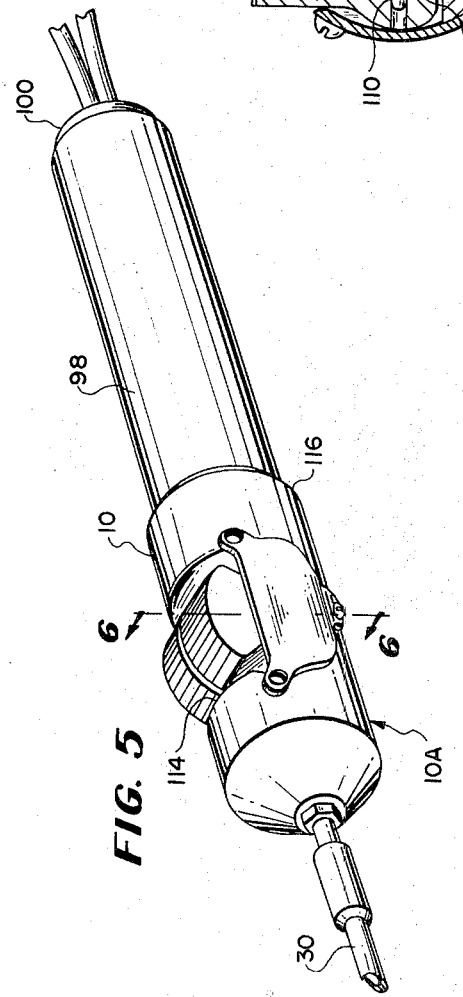

3,831,631

MICRO TORCH

BACKGROUND OF THE INVENTION

In using a propane or acetylene welding torch for fine work like jewelry and minute metal parts assemblies, difficulty is experienced by the artisan or welder in adjusting the torch with conventionally located valves and keeping it in adjustment during its use as when picking up the torch, handling it with two hands as required, and laying it down between uses particularly when accurate adjustment as well as rapid adjustment is very important for quick and delicate work.

Moreover, assembly and servicing of a torch with threaded parts that must be sealed requires close tolerances for all parts which does not lend itself to a quick assembly with seals that provide in use a steady feeling and improved perofrmance.

SUMMARY OF INVENTION

Although a cylindrical resilient valve seat on a rotatable shaft has been used as an adjustable fixed orifice to coact with a port in a wall portion of a circular valve chamber for the purpose of de-equalizing air pressures in a minute flow conduit, the present invention is concerned with providing a shut-off micro and flow varying valve action immediately following and continuing after an initial opening of two valves preferably synchronized to handle under the control of one hand two low pressure gases in a micro welding torch. For ease of manufacture, compact assembly and servicing the valves have interchangeable parts that are coaxially and compactly arranged transversely and quickly accessible in a slender body serving as a handle.

Manual adjustment of the shafts is preferably accomplished through gearing in which their operation is propelled with two handles, shaped as rings or wheels, journalled on a cylindrical body as held in place by C-spring retainers. The rings are self supporting and also hold the valves in place. The edges of the handles are contiguous for joint or separate operation by the thumb or a single finger of an operator in the preferred embodiment as well as a modification thereof.

IN THE DRAWINGS

FIG. 1 is a perspective view approximately to size of the assembled micro torch unit embodying the invention;

FIG. 2 is an exploded, external view of the parts demonstrating their assembly;

FIG. 3 is a transverse sectional view taken on the line 3—3 in FIG. 1;

FIG. 4 is an enlarged longitudinal sectional view taken on line 4—4 in FIG. 3;

FIG. 5 is a perspective view similar to FIG. 1 illustrating another embodiment of the invention;

FIG. 6 is a partially broken away view taken on line 6—6 in FIG. 5; and

FIG. 7 is an enlarged sectional view taken on line 7—7 in FIG. 6.

THE PREFERRED EMBODIMENT

Referring now to the drawings in further detail, it will be observed that the valve body 10 is made symmetrical about two longitudinal planes normal to each other. The planes are the planes of the sections shown in FIG. 1 and FIG. 4. Thereby use can be made of the same manufacturing tools twice in providing the valve compartments and associated conduits and parts for simplicity of manufacture, identical tolerances and interchangeability of like parts in assembly.

Two gas passages 12 and 14 are drilled the major length of the valve body from the rear end of the body and end near the front in angle bores 16 and 18 leading to a mixing chamber 20 that is centrally bored from the front end of the body to receive a flash back arresting mixing plug 22. The mixing compartment is enlarged and threaded 24 at its mouth to receive a welding tip support 26 having a single passage 28 through it to supply the gas mixture to the tip 30.

Transcersely to the gas passages two coaxial cylindrical valve chambers 32 are bored to a common wall 34 between them with central journals 36 in them to support the inner ends 38 of the valves 40 with close concentricity tolerances. The chambers separate the gas passages 12 and 14 into inlet and outlet conduits A and B, respectively, with a valve port 42 at each inlet conduit opening in the chambers 32. If desired, a ring groove 44 can be co-formed in the common wall 34 and an anti-flash back restricted opening 46 can be provided for the oxydizing fluid, leading to the mixing chamber 20. The chamber bores 32 are preferably recessed around their mouths to provide a shoulder 48 to journal a shoulder 50 of the rotatable valve assembly 40.

As seen in FIG. 3 each valve assembly 40 comprises a rotary valve member having a concentric stub shaft 38 on its inner end journalled in the journal 36. Above it an eccentric cylindrical crank 52 disposed co-level with the inlet valve ports 42 is provided to receive and carry a tubular seat 54 of Buna N material having a durometer of 60 to 70. Above the eccentric section 52 a concentric section 56 is provided which receives an O-ring seal 58 under mild compression between it and the shoulder 50 of the bore for sealing and moderate frictional control.

Thus, as a valve member 40 is rotated the seat 54 on it is progressively carried by the crank 52 to roll against the chamber wall 32 to close the port 42. When rotated to open the port it gradually opens the port 42 within the face thereof. The face of the port is cylindrical and the port is oval in contour since, as illustrated, one circular conduit 12 or 14 intersects another cylindrical chamber wall 32 at approximately a right angle thereto form the port 42 as illustrated in FIG. 4. As the valve seat 54 rolls to one side, a narrow portion of the valve port 42 is opened slightly as a segment and is followed by a gradual increase of the segment in a radial direction, thereby providing a progressive finely graduated opening action which still is not a full opening until after the roller seat has relinquished contact with the port edges.

For rotating the valve member 40, a circular head portion 60 is provided on the stem with radial gear teeth 62 on it throughout an arc of at least 180°, but preferably 360°, for ease of production and to make the valve members identical and interchangeable. When the valves 40 are in place a circular encompassing guide element in the form of a ring disc 64 (FIG. 2) internally following the outer contour of the valve heads 60 is slipped endwise over the outer cylindrical surface 66 of the valve body 10 to hold the valves with close tolerance in operative position and remove any pressure forces between the mating gear teeth.

Manually controlled rings or wheels 68 are then slipped into place as journalled on the cylindrical surface 66 of the body with their edges 70 contiguous and supported by the guide 64 and secured in place by snap rings 72 engaging in grooves 74 turned on the valve body 10. The wheels 68 may be marginally recessed, if desired, to engage the guide 64 and are arcuately recessed at 76 on one side to clear the valve gears 62 while also being provided with axial gear teeth sections 78 to engage the radial gear teeth 62 on the valve heads 60.

Although the gearing on the valve heads may extend 360°, once the valve drive is assembled less than 90° are used, and, the gear sectors on the wheels only extend enough to provide this 90° coaction. Stops at both ends of the arc of wheel movement are provided. One of the stops 80 is the end of a recess 76 and the other stop is pin 82 for tactual control along with index marks on the rings with respect to the valve members 40 for assembly or the valve body after the assembly.

Thereby, depending on the assembly, the valves can be assembled for right or left hand turn control, and, in the same or opposite directions, as desired. This versatility leads to an advantage of preferably making both wheels operable in the same direction to open and close both valves. In this relation they can be operated by the same finger at the same time for shut "off" or turn "on". Furthermore, once the proper mixture is adjusted by the two wheels the flame can be increased or decreased by moving both wheels simultaneously for them to move together and maintain their adjusted relation. Moreover, when turning the valves "off", if one wheel does not move enough to turn both off simultaneously the tardy one can be further retracted to its "off" position and when the other reaches its limit of movement it will stop and the one being manually moved will go on to its "off" position.

There is practically no load on the gears and for that reason, although they can be distorted face gears, the teeth 78 on the wheels preferably are of the narrow contact type for ease of manufacture and canted like beveling for full engagement where they engage in the plane of the two axes of rotation.

Although there is appreciable friction in the system derived from the O-rings, 58, such is minimal and provision can be made for providing a further and adjustable frictional rotational brake by drilling and threading radial or axial holes in the wheels, so that adjustable spring pressed shoes can be employed. As shown in FIGS. 1 and 4 the holes 86 are radially disposed to receive a soft metal slug 88 with a light spring 90 adjustably compressed by an Allne screw 92 by the operator. The shoe slides against Allen cylindrical surface 66.

For supplying the torch with the working fluids, the entrances of the conduits 12 and 14 are enlarged and threaded to receive hose nipples 94 to which color coded hoses 96 can be attached. Thereupon a lightweight handle 98 is threaded to the body 10 to cover and take the strain from the hoses as well as resiliently support them by a resilient end grommet 100 where they leave the handle.

For torches requiring substantially the same mixture ratio it is desirable to maintain that ratio while changing from one volume to another. In the present invention the proportioning ratio can be reflected in the relative sizes of the ports and their oval shape as coacting with cylindrical valve seats with the control wheels capable of being rotated simultaneously throughout the working portion of the range once the mixture proportion is set, thereby making it instantly possible to change from a micro flame to a larger flame, and also to change from a large to a micro flame when the torch is idle, or is to be relit between uses.

Otherwise, the valve parts can be made identical, and only the wheels are differentiated as by the oxygen wheel 68G being of an appreciably larger diameter than the fuel control wheel 68R, as shown, to provide a tactual as well as visual demarcation between the valves for sure single hand handling and adjustment of the torch. Furthermore, the rims of the wheels are scabrous and marked with suitable indicia for certainty of their operation.

The rolling relation of the valve 40 also lends itself with versatility to specialized performance characteristics from fast to slow opening and with respect to extent of manual movement required. Various opening effects including nonlineal opening with critical micro action in some relative positions can also be provided in a system embodying the invention.

Furthermore, it will be appreciated from FIGS. 5, 6 and 7 that the wheels 68 can be modified by sectoring to be mounted directly on and coaxial with the eccentric valve members 40 having flange portions limited in length and overlapping the upper side of the torch for operational movement in a direction aligned with the handle 98. In such an embodiment, the manual controls are sectors 106 of knurled cup wheels 108 secured directly to shafts 110 of the roller valves 52 shown herein with the roller valves oriented to open in opposite directions of their rotation as viewed from the handle ends of the valves. The flange sector extends approximately 120° and an arc of clearance 112 in the wall of the body 10A 180° is provided to accommodate its movement and to expose a manual contact area of 70° within the opening 114 for less than 90° movement. The edges of the flange sectors 106 are contiguous for joint contact by a thumb for joint operation, as illustrated. The handle hubs slip on the valve stems 110 like socket wrench in proper orientation and each is held in place by shells 113 bearing against them in point engagement at 114.

The lower side of the torch valve body is reduced in size and contoured at 116 to provide a finger locating shoulder for orienting the index finger of the hand manipulating the torch for the convenient positioning of the thumb over the valve sector controls 106 for single hand control. The action of the thumb in this embodiment is forward and back instead of laterally, but the torch and adjustments are otherwise the same.

In operation, it will be appreciated geometrically that optimum full closure occurs with the valve port axis and roller axis in intersecting relation. As the roller moves arcuately away therefrom, in either direction, the roller axis approaches and passes to and beyond a chamber radius projected to the side of the port. In doing this, the roller first relinquishes contact with one side of the port and begins to open at that one side while continuing its contact with the other side. This provides a variable wedge-like space between the roller and the port, thereby instituting a separation action at the first side that is more rapid than at the other side until the opened flow area either is reached that is desired or equals the flow area of the inlet conduit.

The eccentricity of the roller movement in the embodiment shown in preferably designed to accomplish the full opening in approximately 60° of angular movment of the roller valve axis. Then the micrometer opening action (smaller increments of opening per increments of distance of manual adjustment) occurs adjacent to the initial opening of the valve port of oblong shape defining a cylindrical surface whose minor diameter is that of the inlet conduit and whose major or working diameter is approximately one fifth that of the cylindrical wall.

A rolling valve seat and port relation is illustrated, not by way of limitation, in which the resiliency of the seat (durometer of 70) closes the opening 42 of a 1/16 inch conduit 12 under a mild compression opposing a low inlet pressure not greater than approximately 10 p.s.i.g. The diameter of the cylindrical valve chamber is 0.311 inch and the diameter of the roller valve seat is 0.250 inch with an eccentricity of 0.030 inch.

The less the eccentricity, in view of the curved wedged shaped opening, the sharper the adjustment possible up to approximately a 90 percent flow opening relation. Thus, the lesser will be the differential between the roller and the wall to the point that the micro-controlled opening of the port can be confined to only a partial opening of the valve port.

On the other hand, the greater the eccentricity the larger the wedge angle and thereby the greater the opening for the same rotational increment, it being desirable geometrically to have the largest possible angle between the port and valve seat contours as the controlling valve flow area equals the flow area of the valve port. In brief, the narrower the valve separation at one end of the oval port opening and the wider the separation at the other end when full flow is attained, the better is the micrometer action of the flow adjustment as where the eccentricity of the roller movement is approximately the radius of the inlet port with the radius of the roller track in the valve chamber approximately four times the port radius. The size and shape of the port thereby is the primary consideration.

In this connection it will be appreciated that the inlet conduit can be drilled on an axis that is acute to the axis of the valve chamber in which case the valve port is elongated longitudinally of the cylindrical chamber wall. This could provide a valve which opens to the full flow of fluid through the conduit while the roller valve seat is practically still in contact with the trailing edge of the port opening.

Furthermore, it will be appreciated that a round tube opening through the larger cylindrical wall on an axis lying in a plane perpendicular to the axis of the cylindrical wall does not provide a round opening, but rather an oval opening elongated around the cylindrical surface and is of a length that depends on whether the axis of the tube is radial to the cylindrical wall or chordal thereto, the latter providing in selected degree the major port dimension.

Accordingly, a planned port area can be provided to define a flow area substantially greater in one direction than that of the round tube leading thereto, either transverse to the roller valve or lengthwise thereof. The roller valve may also be provided with a selected eccentricity in which a full flow opening or any fraction thereof can be attained without the roller, or just as the roller, relinquishes contact with the entire circumference of the port edge, thus providing a micro adjustment up to the degree of fullness of flow desired or designed for.

With respect to changing the eccentricity, it is to be noted that since the roller and the port have curvatures differing in radius from each other by the radius of eccentricity, the eccentricity can be the average distance, or less, than the distance the port and valve must move with respect to each other to provide the flow desired. The resiliency of the seat material provides a partial compensation for the curvature difference of the seat and port at their cooperating faces for the low pressure fluid that is to be supplied with micromatic adjustment, particularly for small devices.

Another advantage of the construction and its versatility of design is its longevity and constancy of operation with little if any use deterioration, since the valve elements are subjected to constant unvarying mechanical conditions for micro adjustment regardless of manual effort as compared with axial valves whose threads and valve elements can be heavily overstrained in careless manual closing. Such closing pressures deteriorate yieldable sealing materials while metal to metal contacts tend to pit or distort and require repeated extra pressure to function, particularly with manually handled miniature type tools generally used for fine or intricate work.

What is claimed is:

1. In a micro torch for dispensing fuel and oxidizing fluids the combination of
   a handle and valve body,
   a flow control for each fluid including fluid flow control and proportioning valve members having rotary manually controlled elements disposed contiguous to each other and spaced a distance less than the breadth of a person's finger for both separate and simultaneous adjustment by a single finger to open the valves in the same direction of rotation, said valve control elements being coaxially externally journalled on and around said body and include portions disposed to rotate in parallel planes.

2. The device in claim 1 in which said valve control elements are coaxially disposed with the valves opened and closed in the same directions of their movement.

3. The device in claim 1 including gears intermeshing between one valve member and one element located forwardly of the torch and gears intermeshing between the other valve member and the other element located rearwardly of the torch.

4. In a welding torch, a fluid flow control device for supplying variable proportions of separate fluids under pressure in small amounts for micro welding comprising,
   a body having a conduit for each fluid that is supplied under working pressures and defining an outlet portion and an inlet portion of predetermined flow areas,
   a valve chamber in said body for each conduit disposed between the inlet and outlet of each conduit defined in part by a wall portion defining a surface of revolution intersected by said inlet conduit and defining therewith a valve port,
   rotary valve means journalled in each valve chamber on concentric bearings and each having an eccentric portion disposed opposite said valve port of less radius than that of said wall portion, a roller valve member journalled on each eccentric portion to close said respective valve ports under pressure in one portion of individual relative movement, and means including coaxial rotatable handles for adjustably rotating said rotary valve members and eccentric portions for relative movement between said respective roller valve members and said wall and ports independently and simultaneously to micro adjust the opening of each port with a rolling action with proportional increments of movement.

5. The device defined in claim 4 in which each roller valve member comprises a ring of resilient material carried in a bearing ring mounting for rotation on its said eccentric portion in contact with its respective wall and port.

6. The device defined in claim 4 in which each rotatable handle includes circular manual members journalled around said body, and gearing means interengaging the respective rotary valve means and their manual members, said manual members rotating in the same directions for opening and closing said valve ports.

7. The device defined in claim 5 in which each valve port is elongated with respect to a geometric dimension of the cylindrical surface of the chamber wall.

8. The device defined in claim 5 in which said valve port is elongated upon the face of said wall in the direction of roller valve movement.

9. The device defined in claim 5 in which the valve chambers are separated by a common wall between them and said concentric bearings in each valve member includes a concentric journal on the inner transverse wall thereof and a concentric journal at the mouth of said valve chamber, said rotary valve means rotatively engaging said journals, concentric means sealing said journal at the mouth of each valve chamber, and said rotatable handle means holding said rotating valve means axially in place.

10. In a micro welding torch utilizing fuel and oxidizing fluids, the combination of a valve body having coaxial valve chambers with cylindrical portions and a common end wall between them, an inlet conduit for each chamber opening on the cylindrical wall thereof, a mixing chamber in the body spaced from said cylindrical chambers and including outlet conduits separately interconnecting the respective cylindrical chambers and the mixing chamber and a flash arrester means for thinning out the flow area of the oxydizing fluid, a valve shaft rotatably journalled concentrically in each valve chamber and having an eccentric crank portion thereon opposite said inlet openings, cylindrical valve means journalled on each crank portion including a cylindrical member journalled on said crank portion including a resilient wall surface to roll against the respective cylindrical wall portions over said port to close and progressively open it, and manual means to independently rotate said shafts separately to adjust the proportion of fluids flowing through the outlet conduits.

11. The micro torch defined in claim 10 in which said cylindrical valve means comprises a metal bearing sleeve journalled on said crank portion with a cylindrical elastomer tread member thereon defining said resilient wall surface.

12. In a micro welding torch comprising a body having coaxial valve chambers having wall portions defining gas inlet valve ports connectible to separate sources of gas under low pressure:

valve members, and means mounting said valve members eccentrically for sliding across said ports under pressure to vary the relative valve flow areas of said valve ports;

outlet means from said chambers converging in a mixing chamber in open communication with a single outlet adapted to receive a welding tip;

manual means rotated in the same direction for rotating said valve members in opposite directions to open them including coaxially disposed rotatable elements in close proximity with each other to be engaged simultaneously by the thumb of an operator's hand that is manipulating the torch.

13. The combination called for in claim 12 in which said valve members include resilient elements engaging said ports.

14. The combination called for in claim 12 in which said manual means rotate in parallel planes spaced apart a distance less greater than the width of a person's finger.

* * * * *